(12) United States Patent
Ratjen

(10) Patent No.: US 8,947,719 B2
(45) Date of Patent: Feb. 3, 2015

(54) METHOD FOR CONTROLLING THE SPEED OF PRINTING

(71) Applicant: Heidelberger Druckmaschinen AG, Heidelberg (DE)

(72) Inventor: Hans-Jürgen Ratjen, Bad Bramstedt (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 14/154,535

(22) Filed: Jan. 14, 2014

(65) Prior Publication Data

US 2014/0198345 A1    Jul. 17, 2014

(30) Foreign Application Priority Data

Jan. 14, 2013  (DE) .................. 10 2013 000 503

(51) Int. Cl.
   *G06F 3/12*    (2006.01)
   *G06K 15/02*   (2006.01)
   *B41J 11/00*   (2006.01)

(52) U.S. Cl.
   CPC ........ *G06K 15/1809* (2013.01); *G06K 15/1823* (2013.01); *G06K 15/1857* (2013.01); *B41J 11/002* (2013.01)
   USPC ............ 358/1.15; 358/1.1; 358/1.18; 347/14; 347/181

(58) Field of Classification Search
   CPC ............................. G06F 3/1243; G06F 3/124
   USPC ..................... 358/1.15, 1.1, 1.18; 347/14, 181
   See application file for complete search history.

(56) References Cited

U.S. PATENT DOCUMENTS

| 6,762,855 B1 * | 7/2004 | Goldberg et al. .............. 358/1.5 |
| 2007/0019061 A1 | 1/2007 | Koyabu et al. |

FOREIGN PATENT DOCUMENTS

| DE | 102005054440 A1 | 5/2007 |
| DE | 102011000001 A1 | 7/2012 |
| EP | 1160787 A2 | 12/2001 |
| WO | 2007057259 A1 | 5/2007 |

* cited by examiner

*Primary Examiner* — Jacky X Zheng
(74) *Attorney, Agent, or Firm* — Laurence A. Greenberg; Werner H. Stemer; Ralph E. Locher

(57) ABSTRACT

A method for controlling printing speed of print jobs having different printing images on printing material, includes calculating printing data from a first static component, calculating and combining printing data from first variable components with printing data from the first static component forming first printing data and forwarding the first printing data to a printing unit, counting a current value with a counter, calculating printing data from a second static component, printing first printing images with the printing unit using first printing data and controlling printing speed of the printing unit to conclude the calculation before the counter reaches a value, calculating and combining printing data from the second variable components with printing data from the second static component forming second printing data and forwarding second printing data to the printing unit, and printing the second printing images with the printing unit using second printing data.

10 Claims, 1 Drawing Sheet

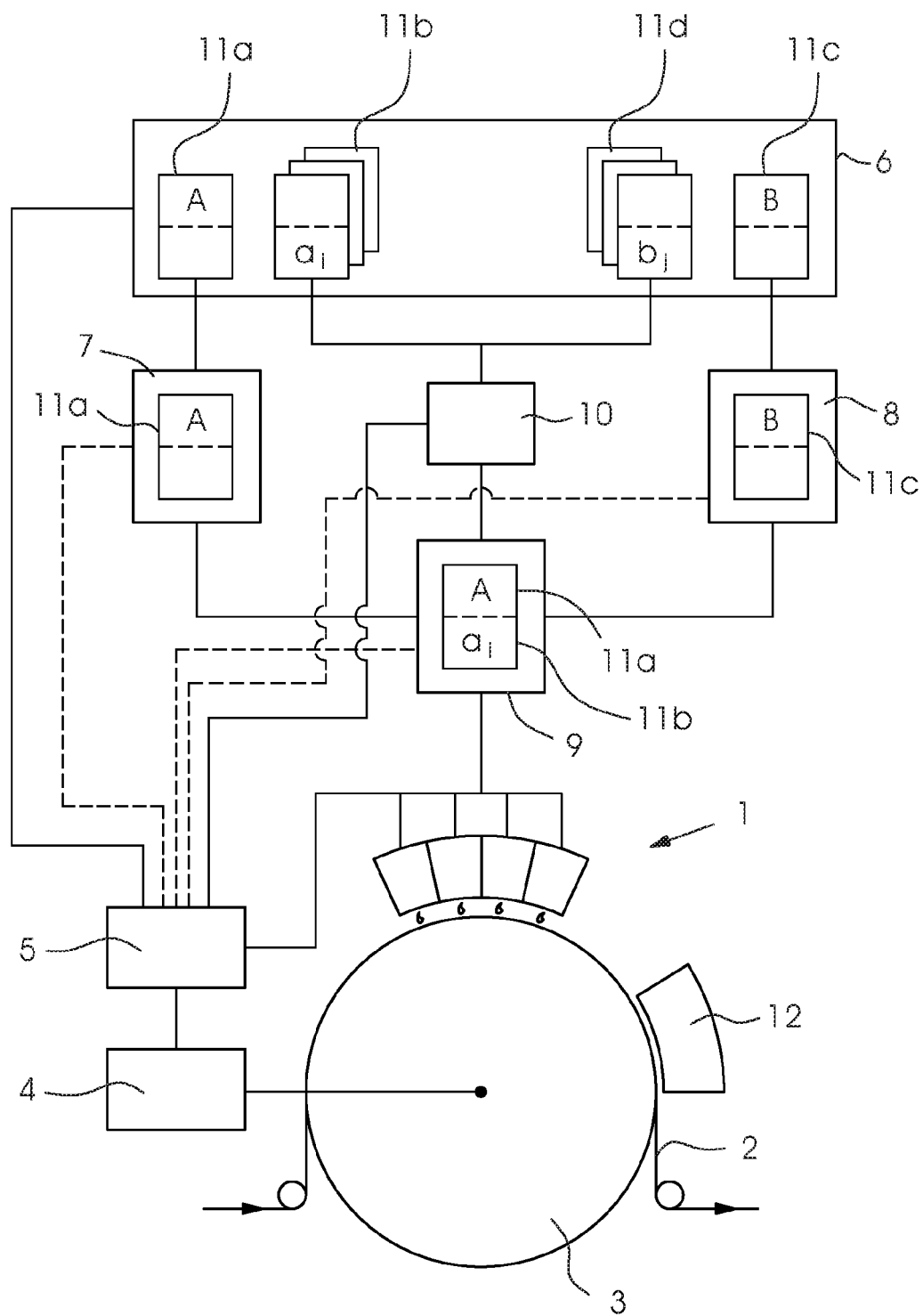

METHOD FOR CONTROLLING THE SPEED OF PRINTING

CROSS-REFERENCE TO RELATED APPLICATION

This application claims the priority, under 35 U.S.C. §119, of German Patent Application DE 10 2013 000 503.5, filed Jan. 14, 2013; the prior application is herewith incorporated by reference in its entirety.

BACKGROUND OF THE INVENTION

Field of the Invention

The present invention relates to a method for controlling the speed of printing when printing at least two successive print jobs each including at least two mutually different printing images on printing material, in which a first print job has n first printing images each having a first static component (A) and each having a first variable component ($a_i$ where i=1 to n and n is an element selected from positive integers), and a second print job has m second printing images each having a second static component (B) and each having a second variable component ($b_j$ where j=1 to m and m is an element selected from positive integers).

During industrial printing with digital printing systems, such as with inkjet printers, for example, it is known to be possible to change the printing image of successive print jobs without difficulty. That change can even be made so quickly that each individual printing image is printed only once (print jobs having only one print). However, problems arise in those cases in which the printing process is carried out at high speed, the printing images change very frequently and, at the same time, represent considerable digital data, since the printing data relating to the rapidly changing printing images has to be calculated during the printing. The calculation of the printing data can additionally be very complicated if the corresponding image data is very complex. Thus, the greater the quantities of data to be calculated, the greater the requirements on the computer involved become, i.e. it is then possible to use only very expensive high-performance workstations. That is correspondingly true if it is not the complete printing image but only a proportion of the printing images that changes, i.e. if the printing image has static and variable components. A further problem is that a lack of data leads to a stoppage of the printing process and that, in that case, the printing material, for example a film web populated with sticky labels, has to be conveyed back and positioned in accurate register before continuing to print, in order to ensure seam-free ongoing printing. In addition if a drying process is provided, for example by using a UV dryer, it must likewise be interrupted and started again at the correct time.

One example of the quantities of data that arise is that a label printing system having a printing width of, for example, 324 mm (corresponding to 3 cascaded printing modules from the manufacturer Kyocera) with a print resolution of 600 dpi at a speed of 50 m/min "needs" a net data rate of about 200 Mb/s with a color depth of 3 bits and 4 colors.

A solution to that problem was heretofore seen in already calculating and storing all the printing images in advance. However, that solution leads to the problem that correspondingly large data memories have to be made available as buffer memories. Another solution was seen in estimating in advance by computation how much computing time the computer will need and setting the speed of printing on the basis of that estimate. However, since such an estimate is always afflicted with errors and the error increases with the complexity of the image data, a satisfactory estimate is often not possible in the case of complex image data and, as a consequence, the speed of printing must be set lower than necessary, in order to prevent any possible lack of data.

There is a similar problem in a remote area of technology, which is during the so-called burning of CDs, since there, too, a lack of data during burning and stopping the burning operation should be prevented. European Patent Application EP 1 160 787 A2 discloses a method for writing optical media, e.g. CD or DVD, in which the writing speed is matched dynamically to the quantity of data in a buffer and to the change in that quantity of data, preferably being reduced in the event of a buffer threatening to run empty. However, no variable contents are written onto a series of a plurality of optical media. Instead, the method described relates only to the data management when writing an individual medium.

SUMMARY OF THE INVENTION

It is accordingly an object of the invention to provide a method for controlling the speed of printing when printing at least two successive print jobs each having at least two mutually different printing images on printing material, which overcomes the hereinafore-mentioned disadvantages of the heretofore-known methods of this general type and which permits the speed of printing to be matched dynamically to the performance of a system involved in particular in the calculation and the transfer of printing data, for example of a computer, and necessary interfaces.

With the foregoing and other objects in view there is provided, in accordance with the invention, a method for controlling the speed of printing when printing at least two successive print jobs each having at least two mutually different printing images on printing material, including a first print job with n first printing images each having a first static component (A) and each having a first variable component ($a_i$ where i=1 to n and n is an element from the positive integers), and a second print job with m second printing images each having a second static component (B) and each having a second variable component ($b_j$ where j=1 to m and m is an element from the positive integers). The method comprises the following method steps:

A) calculation of the printing data from the first static component (A);

B) successive calculation of the printing data from the first variable components ($a_i$), respective combination with the printing data from the first static component (A) to form first printing data ($A+a_i$) and respective forwarding of the first printing data to a printing unit, with a counter simultaneously counting the current value of i;

C) parallel calculation of the printing data from the second static component (B) during method step B);

D) printing the first printing images with the first printing unit by using the respective first printing data and controlling the speed of printing of the printing unit in such a way that the calculation of method step C) is concluded before the counter reaches the value n;

E) successive calculation of the printing data from the second variable components ($b_j$), respective combination with the printing data from the second static component (B) to form second printing data ($B+b_j$) and respective forwarding of the second printing data to the printing unit; and F) printing the second printing images with the printing unit by using the respective second printing data.

When carrying out the method according to the invention, dynamic adaptation of the speed of printing to the performance of a system involved in particular in the calculation and the transfer of the printing data, for example a computer and the necessary interfaces, is advantageously possible. Also advantageously dispensed with is the necessity to calculate printing data in large numbers in advance and to keep it ready in a memory which has to be dimensioned to be correspondingly large and is expensive. Finally, it is advantageously possible to prevent the situation in which, when printing at least two successive print jobs each having at least two mutually different printing images on printing material, an undesired stoppage of the printing process occurs due to a lack of data, and thus undesired production cost increases occur. As a result of the dynamic adaptation according to the invention of the speed of printing, even printing processes having very quickly changing static components A and B are possible, i.e. there are only a few values $a_n$ for A and only a few values $b_m$ for B (e.g. n and m are less than 10).

In accordance with another economical and therefore preferred mode of the method of the invention, the calculation in accordance with method steps A), B), C) and E) is carried out by the same computer.

In accordance with a further mode of the method of the invention, that is advantageous for interruption-free printing and is therefore preferred can be distinguished by the fact that the printing data calculated in accordance with method step A) is stored in a first buffer memory, and that the printing data calculated in accordance with method step C) is stored in a second buffer memory.

In accordance with an added mode of the method of the invention, that is advantageous for interruption-free printing and is therefore preferred can be distinguished by the fact that the combination of the printing data in accordance with method step B) or E) is carried out in a combining unit, to which the printing data to be combined is fed from the respective first or second buffer memory and the computer.

In accordance with an additional mode of the method of the invention, that is advantageous for the dynamic speed-of-printing control and is therefore preferred can be distinguished by the fact that, when controlling the speed of printing of the printing unit, the computing speed of the computer during the parallel computation of the printing data from the first variable components ($a_i$) and of the printing data from the second static component (B) is taken into account.

As a result of taking into account the speed of computation of the computer, in particular of an average computer, during the parallel calculation, it is possible to determine approximately, from the knowledge of the number and possible complexity of the data to be calculated, how long the computer will still need in order to calculate all the remaining printing data from the current counter reading i of the first variable components $a_i$ and, in parallel therewith, the printing data from the second static component B. The speed of printing can then be controlled down (or possibly even controlled up) appropriately, so that it is ensured that, following the printing of the last first printing data $A+a_n$ and the corresponding printing images, the printing data from the second static component B is completely calculated and it is possible to begin with the printing of the second printing data $B+b_j$ and the corresponding printing images without significant interruption.

In accordance with yet another mode of the method of the invention, that is advantageous for the dynamic speed-of-printing control and is therefore preferred can be distinguished by the fact that, when controlling the speed of printing of the printing unit, the data transfer speed of the interfaces between the computer, the two buffer memories, the combining unit and the printing unit is taken into account.

Since the respective data has to be led through respective interfaces from the computer through the buffer memory (or the counter) and the combining unit to the printing unit, it is advantageous to take the data transfer speed of these interfaces into account during the dynamic speed-of-printing control, at least in the case in which the transfer of the data lasts substantially longer than the calculation thereof.

In accordance with yet a further mode of the method of the invention, that is advantageous for the printing of variable printing images and is therefore preferred can be distinguished by the fact that the printing is carried out by using at least one inkjet print head.

In accordance with a concomitant mode of the method of the invention, that is advantageous for the dynamic speed-of-printing control and is therefore preferred can be distinguished by the fact that, when controlling the speed of printing of the printing unit, the transport speed of the printing material, the frequency of the droplet expulsion of the inkjet print head and, optionally, the radiated power of a dryer disposed downstream of the inkjet print head, in particular a UV dryer, is changed.

A further development of the method according to the invention that is advantageous for the dynamic speed-of-printing control and is therefore preferred can be distinguished by the fact that a small quantity, preferably less than 100 and particularly preferably about 50 or even only about 10, of the combined first and second printing data are buffered in a buffer memory. From the buffer memory, the printing data is transferred to the printing unit. Thus, not all of the printing data of a print job is calculated and buffered in advance, as in the prior art, but only a proportion. The size of this proportion is advantageously chosen in such a way that the system including the two mechanical (and therefore subject to the action of inertia) components including printing unit and printing material transport permits adaptation of the speed of printing and of the transport speed without any lack of data or excessive data brought about thereby. The additional intermediate buffering of the printing data is accordingly intended to prevent only brief disruptive influences of the sluggish mechanical components on the progress of a print job and the provision of the printing data needed therefor.

The invention as well as such advantageous developments of the invention, will be described in more detail below with reference to the associated drawing and by using a preferred exemplary embodiment.

Other features which are considered as characteristic for the invention are set forth in the appended claims.

Although the invention is illustrated and described herein as embodied in a method for controlling the speed of printing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

The FIGURE of the drawing is a schematic and block diagram illustrating a preferred exemplary embodiment of the method according to the invention by using components involved, their connections and interaction.

DETAILED DESCRIPTION OF THE INVENTION

Referring now in detail to the single FIGURE of the drawing, there is seen a printing unit 1 which is an inkjet printer for four-color printing, i.e. there are four print heads following one another in a transport direction of printing material 2 and oriented transversely thereto. The printing material, for example a carrier film web with a sticky label population, is guided along the print heads on the circumferential surface of a transport cylinder 3. The transport cylinder has a drive 4, which is in turn connected to a control system 5. There is also a connection between the print heads of the printing unit and the control system. These as well as all of the digital connections described below are used for digital data transport and will be designated as interfaces below. The print heads therefore receive, through their interfaces, the printing data needed for the printing of the printing images of the print jobs. The interfaces can be implemented as so-called PCI-express interfaces.

Furthermore, the FIGURE shows a digital computer 6 (e.g. a so-called workstation), first and second, preferably identical, digital buffer memories 7 and 8 (e.g. so-called page buffers which, for example, together with the printing unit 1, can be provided in a printer), a digital combining unit 9 (e.g. a so-called merger, which can likewise be provided in the printer) and a digital counter 10, the interaction of which when carrying out the method according to the invention will be described below.

The following designations will be used below: a first print job includes n first printing images each having a first static component (A) and each having a first variable component ($a_i$ with i=1 to n, where n is an element from the positive integers). A second print job has m second printing images each having a second static component (B) and each having a second variable component ($b_j$ with j=1 to m, where m is an element from the positive integers). The static components A and B can, for example, be background images, into which the respective variable components are printed.

The method described below can be used in particular when printing two-dimensional printing materials, such as sheets or webs of paper, board or (carrier) film and also when printing three-dimensional printing materials such as bottles, cans or carton packs, for example.

A calculation of printing data 11a from the first static component A takes place in the computer 6. This static component represents a fixed, i.e. invariant, component of the printing image for the first print job and can be located, for example as shown, in an upper section of the printing image.

Following the conclusion of the calculation of the printing data from the first static component A, the associated printing data is sent through an interface from the computer 6 to the first buffer memory 7. This buffer memory is connected through an interface to the combining unit 9, so that the first static component A is available to the combining unit.

Likewise, following the conclusion of the calculation of the printing data from the first static component A, the successive calculation of the printing data from the first variable components $a_i$ is carried out in the computer 6. These variable components represent a non-fixed, i.e. variable, component of the printing image for the first print job and can each be located, for example as shown, in a lower section of the printing image. Each printing image from the first print job thus has a static component A and one of the variable components $a_i$.

Following the conclusion of the calculation of the printing data from each first variable component $a_i$, the associated printing data from this variable component $a_i$ is sent through an interface from the computer 6 to the combining unit 9, with the counter 10 simultaneously counting the current value of i. In the combining unit, a respective combination of the printing data from the first variable component $a_i$ with the printing data from the first static component A is then carried out to form first printing data A+$a_i$. Overall, in this way, a series of first printing data A+$a_1$, ..., A+$a_i$, ..., A+$a_n$ is produced. The individual first printing data A+$a_i$ is respectively forwarded through an interface to the printing unit 1. It is only when the first printing data A+$a_i$ are forwarded to the printing unit that the following printing data A+$a_{i+1}$ are combined. The combination is thus carried out as a function of the speed of printing.

Likewise, following the conclusion of the calculation of the printing data from the first static component A, a parallel calculation of the printing data from the second static component B is carried out in the computer 6. In this case, "parallel" means that the calculation of the printing data from the first variable components $a_i$ and the calculation of the printing data from the second static component B are carried out substantially simultaneously. This static component constitutes a fixed, i.e. invariant, component of the printing image for the second print job and can be located, for example as shown, in an upper section of the printing image.

Following the conclusion of the calculation of the printing data from the second static component B, the associated printing data is transmitted through an interface from the computer 6 to the second (alternate) buffer memory 8. This buffer memory is connected through an interface to the combining unit 9, so that the second static component B is available to the combining unit.

As soon as the first printing data A+$a_1$ from the series of first printing data A+$a_1$, ..., A+$a_i$, ..., A+$a_n$ are available to the printing unit, the latter begins with the printing of the first printing images by using the respective first printing data.

The speed at which this printing is carried out is determined by the control system 5, which is connected through respective interfaces to the computer 6 and the counter 10, and optionally to the two buffer memories 7 and 8 and the combining unit 9 as well.

The control system requests information, preferably continuously updated, through the interface to the computer 6, as to how far the calculation of the printing data from the second static component B has progressed or how long it will still last until the conclusion of this calculation. The time needed for the conclusion of this calculation may be designated by TB. In this case, TB depends on the computing power of the computer.

The control system overall requests information, preferably continuously updated, through the interface to the counter 10 and the interface to the computer 6, as to how far the calculation of the first variable components $a_i$ has progressed or how long it will still last until the conclusion of this calculation, i.e. until the conclusion of the calculation of the printing data from $a_n$. The time needed until the conclusion of this calculation may be designated by Ta. In this case, Ta depends on the computing speed of the computer and the speed of printing of the printing unit 1: if the printing unit is currently printing very slowly, then Ta is determined significantly by the speed of printing, whereas in the case of printers currently printing very quickly, Ta is determined significantly by the computing speed of the computer.

The speed of printing of the printing unit 1 is then controlled in such a way that the calculation of the printing data from the second static component B is concluded before the counter 10 reaches the value n, i.e. the speed of printing is reduced (and, as a result, Ta is increased) until TB is less than Ta. It is then ensured that the printing data from the second static component B is available in good time for the printing of the second print job.

When controlling the speed of printing of the printing unit 1, the data transfer speed of the interfaces between the computer 6, the two buffer memories 7, 8, the combining unit 9 and the printing unit 1 can additionally be taken into account. If this data transfer speed has no noticeable influence on the overall duration or a substantial partial duration of the printing process, it can be disregarded when controlling the speed of printing.

Following the conclusion of the calculation of the printing data from the last first variable component $a_n$, the successive calculation of the printing data from the second variable components $b_j$ is carried out in the computer 6. These variable components constitute a non-fixed, i.e. variable, component of the printing image for the second print job and can in each case be located, for example as shown, in a lower section of the printing image. Each printing image from the second print job thus has a static component B and one of the variable components $b_j$.

Following the conclusion of the calculation of the printing data from each second variable component $b_j$, the associated printing data from this variable component $b_j$ are sent through an interface from the computer 6 to the combining unit 9, with the counter 10 simultaneously counting the current value of j (if a further, third print job is then to be produced). In the combining unit, a respective combination of the printing data from the second variable component $b_j$ with the printing data from the second static component A is then carried out to form first printing data B+bj. Overall, in this way, the series of second printing data $B+b_1, \ldots, B+b_j, \ldots, B+b_m$ is produced. The individual first printing data $B+b_j$ are in each case forwarded through an interface to the printing unit 1. It is only when first printing data $B+b_j$ have been forwarded to the printing unit that the following printing data $B+b_{j+1}$ are combined. The combining is thus carried out as a function of the speed of printing.

Finally (if a further, third print job is then still to be produced), the printing of the second printing images is carried out with the printing unit 1 by using the respective second printing data.

When controlling the speed of printing of the printing unit 1, the transport speed of the printing material 2, the frequency of the droplet expulsion of the inkjet print head 1 and, optionally, the heating power of a dryer 12 disposed downstream of the print head, in particular a UV dryer, can additionally be changed.

The invention claimed is:

1. A method for controlling the speed of printing when printing at least two successive print jobs each having at least two mutually different printing images on printing material, the method comprising the following steps:
   providing a first print job including n first printing images each having a first static component A and each having a first variable component $a_i$ where i=1 to n and n is an element selected from positive integers;
   providing a second print job including m second printing images each having a second static component B and each having a second variable component $b_j$ where j=1 to m and m is an element selected from positive integers;
   A) calculating printing data from the first static component A;
   B) successively calculating the printing data from the first variable components $a_i$, respectively combining the printing data from the first variable components $a_i$ with the printing data from the first static component A to form first printing data $A+a_i$, respectively forwarding the first printing data to a printing unit, and simultaneously counting a current value of i using a counter;
   C) calculating the printing data in parallel from the second static component B during method step B);
   D) printing the first printing images with the printing unit by using the respective first printing data and controlling the speed of printing of the printing unit to conclude the calculation of method step C) before the counter reaches the value n;
   E) successively calculating the printing data from the second variable components $b_j$, respectively combining the printing data from the second variable components $b_j$ with the printing data from the second static component B to form second printing data $B+b_j$ and respectively forwarding the second printing data to the printing unit; and
   F) printing the second printing images with the printing unit by using the respective second printing data.

2. The method according to claim 1, which further comprises carrying out the calculation in steps A), B), C) and E) using the same computer.

3. The method according to claim 2, which further comprises storing the printing data calculated in step A) in a first buffer memory, and storing the printing data calculated in step C) in a second buffer memory.

4. The method according to claim 3, which further comprises carrying out the combining of the printing data in step B) or step E) in a combining unit, and feeding the printing data to be combined from the respective first or second buffer memory and the computer to the combining unit.

5. The method according to claim 2, which further comprises taking a computing speed of the computer during the parallel calculation of the printing data from the first variable components $a_i$ and of the printing data from the second static component B into account when controlling the speed of printing of the printing unit.

6. The method according to claim 4, which further comprises taking a data transfer speed of interfaces between the computer, the first and second buffer memories, the combining unit and the printing unit into account when controlling the speed of printing of the printing unit.

7. The method according to claim 1, which further comprises carrying out the printing by using at least one inkjet print head.

8. The method according to claim 7, which further comprises changing a transport speed of the printing material and a frequency of droplet expulsion of the inkjet print head when controlling the speed of printing of the printing unit.

9. The method according to claim 8, which further comprises changing a radiated power of a dryer disposed downstream of the inkjet print head when controlling the speed of printing of the printing unit.

10. The method according to claim 9, wherein the dryer is a UV dryer.

* * * * *